United States Patent
Lazarow

(10) Patent No.: US 10,685,456 B2
(45) Date of Patent: Jun. 16, 2020

(54) PEER TO PEER REMOTE LOCALIZATION FOR DEVICES

(71) Applicant: Microsoft Technology Licensing, LLC, Redmond, WA (US)

(72) Inventor: Gavin D. Lazarow, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 29 days.

(21) Appl. No.: 15/782,748

(22) Filed: Oct. 12, 2017

(65) Prior Publication Data

US 2019/0114802 A1 Apr. 18, 2019

(51) Int. Cl.
*G06T 7/73* (2017.01)
*G06F 3/01* (2006.01)
(Continued)

(52) U.S. Cl.
CPC .............. *G06T 7/74* (2017.01); *G02B 27/017* (2013.01); *G06F 1/163* (2013.01); *G06F 3/011* (2013.01);
(Continued)

(58) Field of Classification Search
CPC ....... G06T 7/74; G06T 19/006; G02B 27/017; G02B 2027/014; H04W 56/001; H04W 84/005
See application file for complete search history.

(56) References Cited

U.S. PATENT DOCUMENTS 6,522,312 B2 2/2003 Ohshima et al.
8,933,931 B2 1/2015 Balan et al.
(Continued)

FOREIGN PATENT DOCUMENTS

WO 2014204756 A1 12/2014

OTHER PUBLICATIONS

"Shared holographic experiences", Retrieved From: <<https://developer.microsoft.com/en-us/windows/mixed-reality/shared_holographic_experiences>>, May 20, 2017, 5 Pages.
(Continued)

*Primary Examiner* — Yu Chen
(74) *Attorney, Agent, or Firm* — Arent Fox LLP

(57) ABSTRACT

Features of the present disclosure solve the above-identified problem by implementing remote localization techniques that enable coordination between multi-user display devices. Specifically, the remote localization techniques identify user location (or "position") in the virtual reality (VR)/augmented reality (AR) scene using a key-frame that is subset of available information. Thus, when a first display device is uncertain regarding its position within a VR/AR scene, the first display may generate, for example, a single key-frame that is shared between one or more second display devices such that the receiving display device(s) may locate the key-frame with respect to a spatial anchor within the client's map, identify the user's location within the VR/AR scene, and transmit the location back to the first HMD device that created the key-frame. Based on the location information, the first HMD device may synchronize with the second HMD device within a shared scene or map.

20 Claims, 7 Drawing Sheets

(51) Int. Cl.
*H04N 21/218* (2011.01)
*H04N 21/81* (2011.01)
*H04N 21/414* (2011.01)
*H04N 21/63* (2011.01)
*G06F 1/16* (2006.01)
*G02B 27/01* (2006.01)
*G06T 19/00* (2011.01)
*H04W 56/00* (2009.01)
*H04W 84/00* (2009.01)

(52) U.S. Cl.
CPC ............ *G06F 3/012* (2013.01); *G06T 19/006* (2013.01); *H04N 21/21805* (2013.01); *H04N 21/41407* (2013.01); *H04N 21/632* (2013.01); *H04N 21/816* (2013.01); *H04W 56/001* (2013.01); *H04W 84/005* (2013.01); *G02B 2027/014* (2013.01)

(56) References Cited

U.S. PATENT DOCUMENTS

| | | | |
|---|---|---|---|
| 9,558,557 | B2 | 1/2017 | Jiang et al. |
| 2007/0110338 | A1* | 5/2007 | Snavely ............ G06F 17/30274 382/305 |
| 2009/0119604 | A1* | 5/2009 | Simard ................. G06Q 10/10 715/757 |
| 2010/0287485 | A1 | 11/2010 | Bertolami et al. |
| 2011/0298824 | A1 | 12/2011 | Lee et al. |
| 2014/0168261 | A1 | 6/2014 | Margolis et al. |
| 2014/0368537 | A1* | 12/2014 | Salter ................... G06T 19/006 345/633 |
| 2015/0302665 | A1* | 10/2015 | Miller .................... G06F 3/011 345/419 |
| 2016/0012643 | A1 | 1/2016 | Kezele et al. |
| 2016/0104452 | A1 | 4/2016 | Guan et al. |
| 2016/0212375 | A1* | 7/2016 | Reitel ................... H04N 7/147 |
| 2018/0300098 | A1* | 10/2018 | Vembar ................ G06F 3/1454 |

OTHER PUBLICATIONS

Ledermann, et al., "Dynamically shared optical tracking", In Proceedings of the First IEEE International Workshop Agumented Reality Toolkit, Sep. 29, 2002, 8 Pages.

"International Search Report and Written Opinion Issued in PCT Application No. PCT/US2018/054487", dated Jan. 25, 2019, 13 Pages.

* cited by examiner

PEER TO PEER REMOTE LOCALIZATION FOR DEVICES

BACKGROUND

The present disclosure relates to computer graphics systems, and more particularly, to remote localization for peer-to-peer sharing.

One area of computing devices that has grown in recent years is the area of virtual reality (VR), augmented reality (AR) and/or mixed reality (MR) devices. Such technology may be incorporated into display devices such as head-mounted display (HMD) device in the form of eyeglasses, goggles, a helmet, a visor, or other eyewear. As used herein, a HMD device may include a device that generates and/or displays virtual reality images (e.g., from at least one virtual environment input), AR images (e.g., from at least one virtual environment input and one real environment input), and/or MR images (e.g., from at least two virtual environment inputs). In such display devices, a scene (one or more image frames) produced for the display device can be oriented or modified based on user input (e.g., movement of a gamepad button or stick to cause movement of the orientation of the scene, introduction of items into the scene, etc.).

The use of a display device such as an HMD device, however, may not be limited to a single-user platform (e.g., a single user utilizing a single HMD device to navigate a VR/AR/MR scene). Instead, there is demand for enabling multi-user platforms that allow multiple users to collaborate on a shared session (e.g., VR/AR/MR images or scene) using multiple HMDs (e.g., multiple users playing the same game in VR/AR/MR). Enabling collaborative multi-user virtual platform requires extensive processing and bandwidth resources. For example, conventional multi-user virtual platforms require each HMD device to periodically export and import significant hologram data (e.g., 10-20 megabytes) to and from other HMD device(s) such that each device may coordinate and synchronize the location of each of the multiple users within the shared session. However, sharing of such large amounts of data stresses the processing and bandwidth resources of the devices, and may adversely impact user experience.

SUMMARY

Features of the present disclosure solve the above-identified problem by implementing remote localization techniques that enable coordination between multiple users using multiple display devices (e.g., HMD devices, smart phones, tablets, etc.) within a shared coordinate system of an environment (e.g., virtual and/or real environment) associated with the shared session. The multiple users may be either collocated (e.g., in the same room) and/or remotely located (e.g., one in one room, while another in a different room or city). Specifically, in contrast to exporting significant hologram data (e.g., 10-20 megabytes) to and from other HMD device(s), the remote localization techniques identify user location (or "position") in the virtual shared scene using a limited set of data (e.g., a key-frame that may be as little as 1.5 megabytes). The key-frame may contain session information, including one or more image data from the display device's head-tracking sensors and/or calibration information for cameras and other sensors (e.g., gravity sensor). Thus, when a first HMD device is uncertain regarding its position within a shared virtual session (e.g., the HMD is unable to locate the hologram object or map), the first HMD may generate, for example, a single key-frame that is shared between one or more second HMD devices such that the second receiving HMD device(s) may locate the key-frame with respect to a spatial anchor within the client's map, identify the user's location within the VR/AR/MR scene, and transmit the location (e.g., coordinate positions) back to the first HMD device that created the key-frame. Based on the location information, the first HMD device may synchronize with the second HMD device within a shared scene or map.

One example implementation relates to a method for synchronizing a first display device with a second display device within a shared coordinate system. The method may comprise establishing, between the first display device and the second display device, a shared coordinate system of an environment. The shared session may coordinate system may include a first spatial anchor that is fixed in three dimensional space of the environment at a first position coordinates. The method may further include determining that the second display device is uncertain of its location within the shared coordinate system of the environment generated by the first display device with respect to the position of the first spatial anchor. The method may further include generating, at the second display device, key frame information in response to determining that the second display device is uncertain of its location. The key frame information may include a subset of available session information at the second display device. The method may further include transmitting, from the second display device to the first display device, a remote localization request that includes the key frame information.

Another example implementation relates to a display device. The display device may include a memory to store data and instructions, a processor in communication with the memory to execute instructions. The processor may execute instructions to establishing, between the first display device and the second display device, a shared coordinate system of an environment. The shared coordinate system includes a first spatial anchor that is fixed in three dimensional space of the environment at a first position coordinates. The instructions may further be executable by the processor to determining that the second display device is uncertain of its location within the shared coordinate system of the environment generated by the first display device with respect to the position of the first spatial anchor. The instructions may further be executable by the processor to generating, at the second display device, key frame information in response to determining that the second display device is uncertain of its location. The key frame information may include a subset of available session information at the second display device. The instructions may further be executable by the processor to transmit, from the second display device to the first display device, a remote localization request that includes the key frame information.

Another example implementation relates to a computer-readable medium having code executed by the processor for synchronizing a first display device with a second display device within a shared coordinate system. The computer-readable medium may include code for establishing, between the first display device and the second display device, a shared coordinate system of an environment. The shared session may coordinate system may include a first spatial anchor that is fixed in three dimensional space of the environment at a first position coordinates. The computer-readable medium may further include code for determining that the second display device is uncertain of its location within the shared coordinate system of the environment generated by the first display device with respect to the position of the first spatial anchor. The computer-readable medium may further include code for generating, at the second display device, key frame information in response to determining that the second display device is uncertain of its location. The key frame information may include a subset of available session information at the second display device. The computer-readable medium may further include code for transmitting, from the second display device to the first display device, a remote localization request that includes the key frame information.

Another example implementation relates to another method for synchronizing a first display device with a second display device within a shared coordinate system. The method may comprise mapping at least one hologram object in a three dimensional space relative to a first spatial anchor that is fixed in the three dimensional space at a first position coordinates. The method may further include establishing the shared coordinate system of an environment between the first display device and the second display device based on the mapping. The establishing of the shared coordinate system may include transmitting the first spatial anchor to the second display device. The method may further include receiving, at the first display device, a remote localization request from the second display device, wherein the remote localization request includes key frame information having a subset of available session information at the second display device. The method may further include determining the location of the second display device within the shared coordinate system of the environment relative to the first spatial anchor based on the key frame information. The method may further include transmitting a remote localization response from the first display device that includes transform information of the first display device within the shared session.

Another example implementation relates to a display device. The display device may include a memory to store data and instructions, a processor in communication with the memory to execute instructions. The processor may execute instructions to map at least one hologram object in a three dimensional space relative to a first spatial anchor that is fixed in the three dimensional space at a first position coordinates. The instructions may further be executable by the processor to establish the shared coordinate system of an environment between the first display device and the second display device based on the mapping, wherein the establishing of the shared coordinate system includes transmitting the first spatial anchor to the second display device. The instructions may further be executable by the processor to receive, at the first display device, a remote localization request from the second display device, wherein the remote localization request includes key frame information having a subset of available session information at the second display device. The instructions may further be executable by the processor to determine the location of the second display device within the shared coordinate system of the environment relative to the first spatial anchor based on the key frame information. The instructions may further be executable by the processor to transmit a remote localization response from the first display device that includes transform information of the first display device within the shared session.

Another example implementation relates to a computer-readable medium having code executed by the processor for synchronizing a first display device with a second display device within a shared coordinate system. The computer-readable medium may include code for mapping at least one hologram object in a three dimensional space relative to a first spatial anchor that is fixed in the three dimensional space at a first position coordinates. The computer-readable medium may further include code for establishing the shared coordinate system of an environment between the first display device and the second display device based on the mapping. The establishing of the shared coordinate system may include transmitting the first spatial anchor to the second display device. The computer-readable medium may further include code for receiving, at the first display device, a remote localization request from the second display device, wherein the remote localization request includes key frame information having a subset of available session information at the second display device. The computer-readable medium may further include code for determining the location of the second display device within the shared coordinate system of the environment relative to the first spatial anchor based on the key frame information. The computer-readable medium may further include code for transmitting a remote localization response from the first display device that includes transform information of the first display device within the shared session.

The above presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DESCRIPTION OF THE FIGURES

The disclosed aspects of the present disclosure will hereinafter be described in conjunction with the appended drawings, provided to illustrate and not to limit the disclosed aspects, wherein like designations denote like elements, where a dashed line may indicate an optional component, and in which.

DETAILED DESCRIPTION

Figure 1:
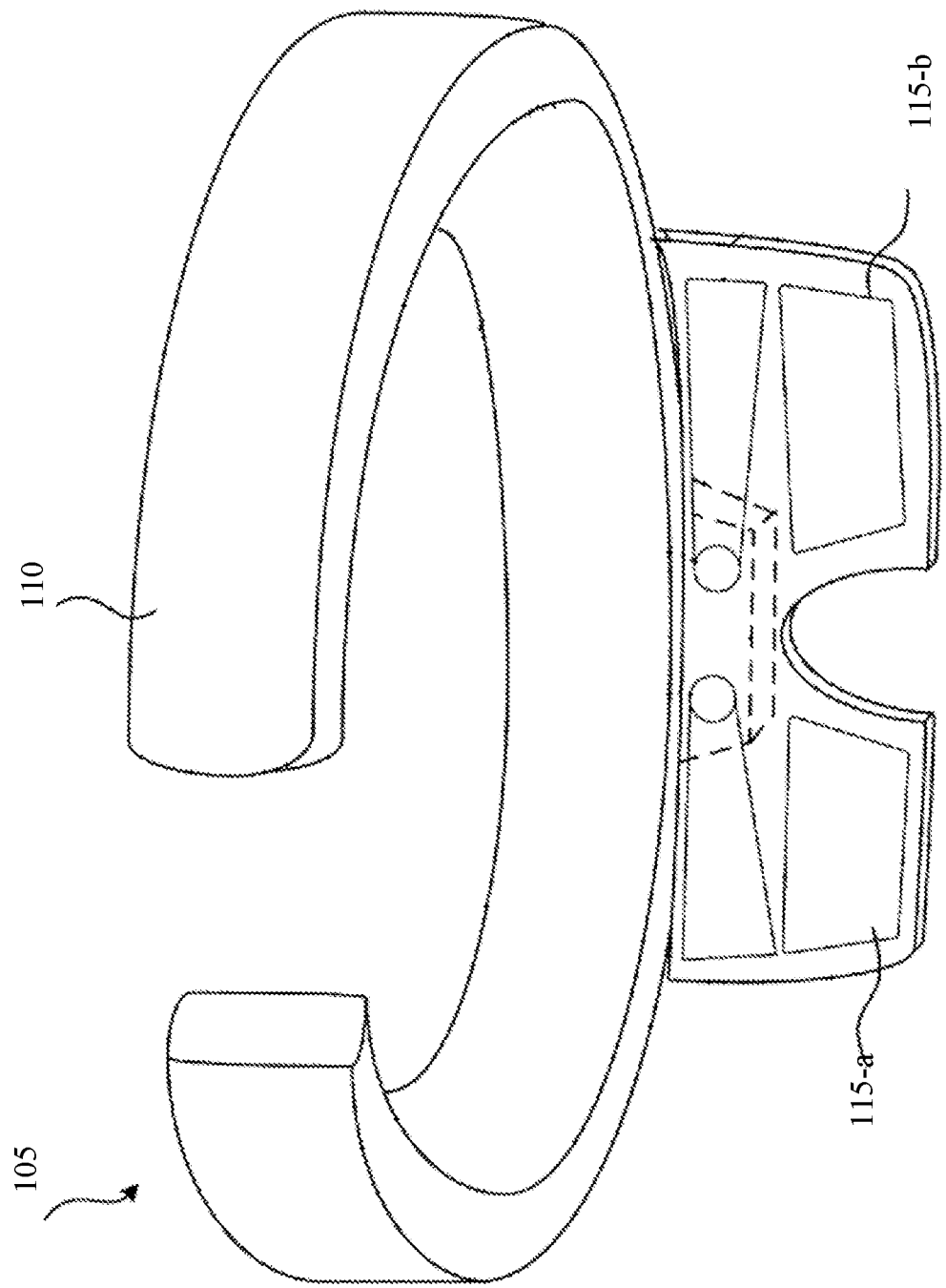
FIG. 1 is a schematic diagram of an example of an HMD device in accordance with an implementation of the present disclosure.

As discussed above, the use of HMD devices may not be limited to a single-user platform. Instead, there has been significant development towards enabling multi-user virtual platforms that allow multiple users to collaborate within a shared coordinate system of an environment (e.g., virtual and/or real environment) associated with a shared session (e.g., VR/AR/MR scene or images in a shared coordinate system) using multiple HMDs. Conventional systems that implement multi-user virtual platforms, however, are resource intensive. For example, such systems may require the HMD devices to periodically share large quantities of data (e.g., a spatial map and each user's current location) in order to enable synchronization of the coordinate system with other HMD devices. This large amount of data that is required to be shared in prior solutions drains resources by requiring extra time and processing power to collect, share, import, and process for localization.

Additionally, in some cases, such as where such data is associated with an AR scene (virtual environment such as a virtual chess board overlaid on real environment such as a physical table in the room), sharing of data may also require exporting data associated with both the virtual environment and the real environment. Sharing of real environment data that is captured by cameras on the HMD, however, may raise privacy issues as images of the user's environment (e.g., the room in which the user is located) would also be transmitted over the network to at least the second HMD device. Such transmission may provide the second user access to raw data of the shared user environment, thereby potentially exposing private information of the user of the first HMD device.

The remote localization techniques implemented herein may address one or more of the above-identified problems by generating and exporting a limited key frame(s) (e.g., 1.5 megabyte) for peer-to-peer sharing for use in localization to synchronize devices. The term "remote localization" may refer to accessing or enlisting a remote device (e.g., second HMD device) to identify the location of a first HMD device within the shared coordinate system of the environment (e.g., virtual and/or real environment). The term "key frame" may refer to the three dimensional (3D) model of where the user of the sending device is currently located within one or both of the virtual and physical environment (e.g., a coordinate position). The key-frame, may include one or more image data from the display device's head-tracking sensors and/or calibration information from cameras and other sensors (e.g., gravity sensor) from the display device's perspective of the environment of the shared coordinate system (e.g., the field of view observed from the display device). Thus, in some examples, the generated key frame may include a limited subset of data points associated with the environment (e.g., a partial view of an object, such as a virtual chess board and/or a physical table, that is fixed in the real environment) from a plurality of available data points (e.g., entire virtual chess board and the physical characteristics of the user's entire room in the real environment).

The generated key frame may be transmitted from the first HMD device to the second HMD device, which may utilize the information contained within the key frame to identify the first user's location (e.g., position information) within the shared virtual session or virtual map. The second HMD device may then identify the first user's position based on the key frame. In response to the identification of the first user's position, the second HMD device may transmit the identified position information back to the first HMD device in order to allow the first HMD device to synchronize coordinate systems with the second HMD device.

Utilizing the key frame(s), as opposed to large quantities of hologram data, to identify user location (or position) reduces the amount of data that is required to be transferred, minimizes privacy issues, and improves overall processing speed in achieving synchronization (e.g., 2 seconds for remote localization technique as opposed to approximately 61 seconds realized for conventional systems).

For example, in one implementation, the present disclosure provides a peer-to-peer (P2P) remote localization system including techniques for aligning two or more mixed-reality devices into the same coordinate system by having a device (e.g., a querying device) that is unsure of its location relative to a shared coordinate system issue a query to another device (e.g., a sharing device). The sharing device then uses its knowledge of the environment to localize the query data relative to the shared coordinate system and return that information, e.g., a transform, to the querying device. If a successful localization is found, then the resulting relative transform (e.g., a relative position and/or pose or offset between a point in the shared coordinate system known by the sharing device and the location of a point in the query data of the querying device) can be incorporated into the querying device's environment map. In other words, the querying device can adjust the position of the point in the query data based on the relative transform, thereby aligning its coordinate system with the shared coordinate system. Thus, both devices will then know their location with respect to the shared coordinate system and can render holograms in the same physical location (or do other reasoning).

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Turning first to FIG. 1, an example of a display device 105, such as an HMD, is illustrated that may implement display techniques in accordance with the present disclosure. The HMD 105 may be configured to provide virtual reality images (e.g., from at least one virtual environment input), mixed reality (MR) images (e.g., from at least two virtual environment inputs), and/or augmented reality (AR) images (e.g., from at least one virtual environment input and one real environment input). The HMD 105 comprises a headpiece 110, which may be a headband, arranged to be worn on the user's head. It should be appreciated by those of ordinary skill in the art that the HMD 105 may also be attached to the user's head using a frame (in the manner of conventional spectacles), helmet, or other fit system. The purpose of the fit system is to support the display and provide stability to the display and other head-borne systems such as tracking systems, sensors, and cameras.

The HMD 105 may include optical components 115 (e.g., one or more lenses), including waveguides that may allow the HMD 105 to project images generated by a light engine included within (or external) to the HMD 105. The optical components 115 may use plate-shaped (usually planar) waveguides for transmitting angular image information to users' eyes as virtual images from image sources located out of the user's line of sight. The image information may propagate along the waveguides as a plurality of angularly related beams that are internally reflected along the waveguide. Diffractive optics are often used for injecting the image information into the waveguides through a first range of incidence angles that are internally reflected by the waveguides as well as for ejecting the image information through a corresponding range of lower incidence angles for relaying or otherwise forming an exit pupil behind the waveguides in a position that can be aligned with the users' eyes. Both the waveguides and the diffractive optics at the output end of the waveguides may be at least partially transparent so that the user can also view the real environment through the waveguides, such as when the image information is not being conveyed by the waveguides or when the image information does not fill the entire field of view.

The light engine (not shown), which may project images to be displayed on the optical components 115, may comprise a light source (e.g., a laser), a micro display and imaging optics in the form of a collimating lens. The micro display can be any type of image source, such as liquid crystal on silicon (LCoS) displays, liquid crystal displays (LCD), matrix arrays of LED's (whether organic or inorganic) and any other suitable display. The optical components 115 may focus a user's vision on one or more portions of one or more display panels. The display panels may display one or more images (e.g., left eye image and right eye image) based on signals received from the light engine. Thus, the optics may include left eye optics 115-*a* for focusing the user's left eye on the left eye image and right eye optics 115-*b* for focusing the user's right eye on the right eye image. For example, the optics 115 may focus the user's eyes on a central portion of each of the left eye image and the right eye image. The user's brain may combine the images viewed by each eye to create the perception that the user is viewing a 3D environment.

Figure 5:
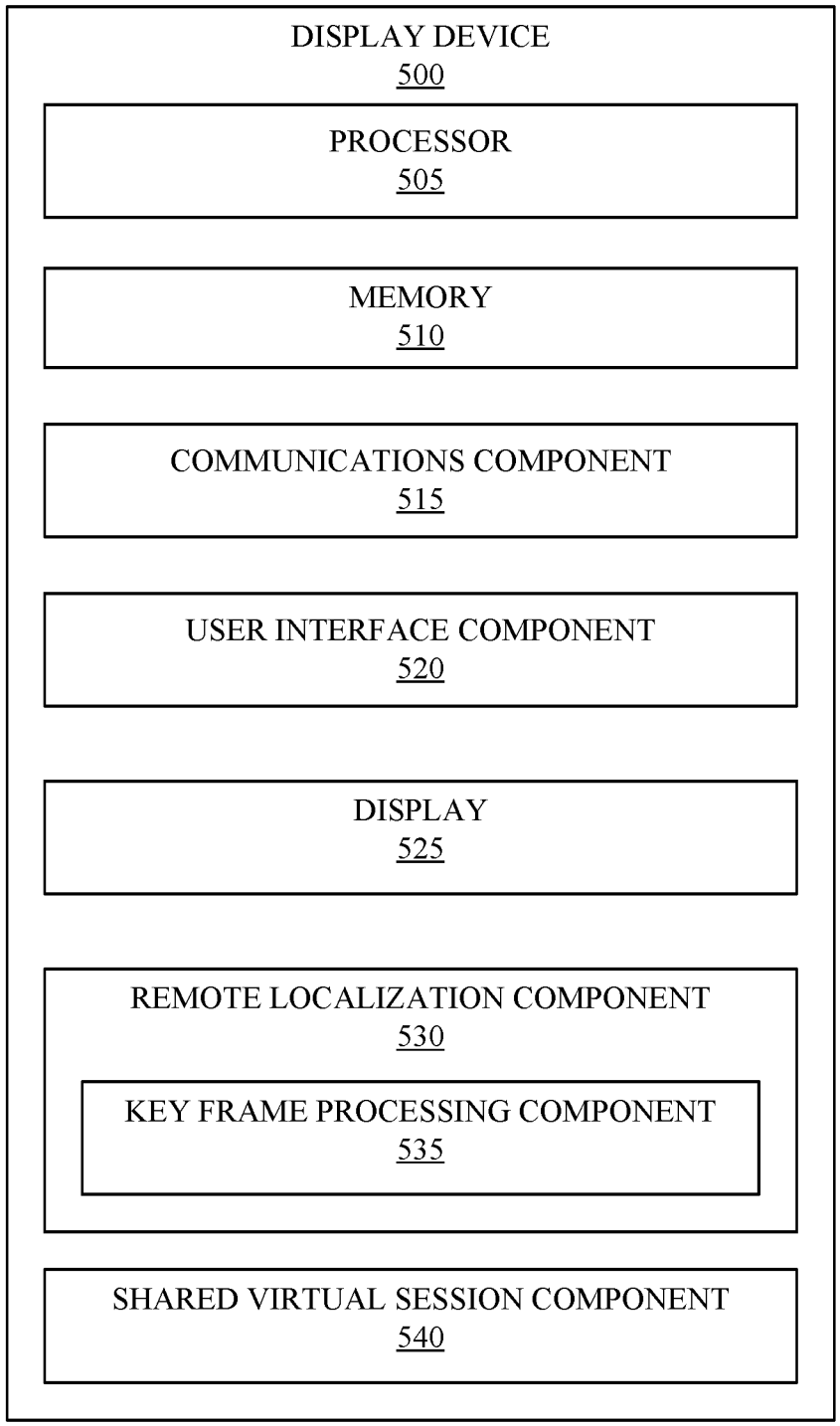
FIG. 5 is a schematic block diagram of an example device in accordance with an implementation of the present disclosure.

Though not shown in FIG. 1, a processing apparatus 405, memory 410 and other components may be integrated into the HMD device 105 (see FIG. 5). Alternatively, such components may be housed in a separate housing connected to the HMD 105 by wired and/or wireless communication links. For example, the components may be housed in a separate computer device (e.g., smartphone, tablet, laptop or desktop computer, etc.) which communicates with the display device 105. Accordingly, mounted to or inside the HMD 105 may be an image source, such as a micro display for projecting a virtual image onto the optical component 115. As discussed above, the optical component 115 may be a collimating lens through which the micro display projects an image.

In some examples, one or more HMDs 105 may be communicatively paired (via a wired or wireless communication link) in a shared session that includes a shared coordinate system of an environment that allows multiple users to collaborate on the same shared virtual session (e.g., multi-user games and/or multiple users experiencing the same environment). In such situation, a shared virtual session may be initiated by a first user operating a first HMD 105 (also referred to as "sharing device") that generates and shares a coordinate system of the environment (e.g., map of the hologram object(s) and physical table in the first user's real environment), including, for instance, a "spatial anchor," to a set of one or more second HMDs 105. A spatial anchor represents point in the coordinate system of the environment that the system should keep track of over time. For instance, in one example, a spatial anchor may be a set of one or more points that identify a position and/or orientation of a real object in the real world environment. Spatial anchors of one HMD 105 may be adjusted, as needed, relative to other anchors or frames of reference of one or more other HMDs 105, in order to ensure that anchored holograms stay precisely in place in a location that is synchronized in the shared coordinate system of the environment shared by the group of HMDs 105 in the shared session.

Rendering a hologram based on a known position and/or orientation of an anchor within the shared coordinate system provides the most accurate positioning for that hologram at any given time in the shared virtual session. For example, mixed reality applications may map hologram objects into the real environment as if the hologram object appears as a real object. For example, a hologram object such as a virtual chessboard may be mapped into a real environment, such as by being placed on top of a physical table that is located in the user's room as captured by the cameras of the HMD 105. In the above example, the x-y-z coordinates and position of the physical table upon which the hologram object is mapped may be the "spatial anchor" that is fixed in the shared coordinate system of the user's real environment. The position and/or orientation of the pieces of the virtual chess board may be modified and adjusted by user's input (gestures) that may move the pieces as if they were real objects.

Thus, in order to facilitate a shared virtual session, the first HMD 105 may share the shared coordinate system of the environment (virtual and/or real environment) associated with the shared virtual session with one or more second HMDs 105. The shared coordinate system may include one or more of the hologram object information as well as the spatial anchor position (x-y-z coordinates and orientation) of the physical table in the user's environment. As the first HMD 105 is responsible for mapping the virtual and real environment, the first HMD 105 may be knowledgeable of not only the coordinate system of the environment as observed in the field of view of the first HMD 105, but may also be knowledgeable of the entire environment in the shared coordinate system, which may include hologram objects and real environment objects outside the immediate field of view of the first HMD 105.

The second HMD 105 that may participate in the shared coordinate system of the environment (virtual and/or real environment) associated with the shared virtual session, however, may have a limited knowledge of the coordinate system of the environment shared by the first HMD 105. As such, in some examples, although the first HMD 105 may share the spatial anchor coordinate position of the physical table within the environment (referred to as "first spatial anchor") of the shared virtual session, the second HMD 105 may fail to (or be unable to) to identify the location of the first spatial anchor within the environment known by the second HMD 105.

In such a situation, the second HMD 105 may initiate remote localization procedure by generating a key frame that may be a three dimensional (3D) model of where the user of the second HMD 105 device is currently located within one or both of the virtual and physical environment (e.g., a coordinate position). This may include capturing one or more image(s) associated with the field of view of the second HMD 105 based on cameras on the second HMD 105. Additionally or alternatively, the key frame, may include one or more image data from the display device's head-tracking sensors and/or calibration information from cameras and other sensors (e.g., gravity sensor) from the display device's perspective of the environment of the shared coordinate system. While the second HMD 105 may be unable to identify the location of the first spatial anchor (e.g., table), the second HMD 105 may nonetheless be able to identify another fixed spatial anchor (e.g., a corner of a bookshelf) that is within the field of view of the second HMD 105. Thus, the second HMD 105 may include the location of the second spatial anchor within the key frame information that is transmitted to the first HMD 105 for remote localization.

In turn, the first HMD 105 (e.g., the sharing device) may process the key frame(s) received from the second HMD 105 to determine information to provide to the second HMD 105 to align coordinate systems. For example, the first HMD 105 may determine the location and position of the second spatial anchor identified by the second HMD 105 within the shared coordinate system of the first user's environment. The first HMD 105, based on the greater knowledge of the environment than the second HMD 105, may determine the location of the second spatial anchor (e.g., corner of bookcase), and then determine the location of the second spatial anchor relative to the first spatial anchor (e.g., table) within the shared coordinate system of the environment associated with the shared session. By identifying the second spatial anchor position, the first HMD 105 may be able to determine the location of the second HMD 105 within the coordinate system of the environment associated with the shared session, and share the relative difference position information with respect to the first anchor, or the second anchor position information in the shared coordinate system, with the second HMD 105 to facilitate synchronization of two devices within the shared session such that the second HMD 105 is able to identify the position and orientation of the first spatial anchor (i.e., the table).

Figure 2A:
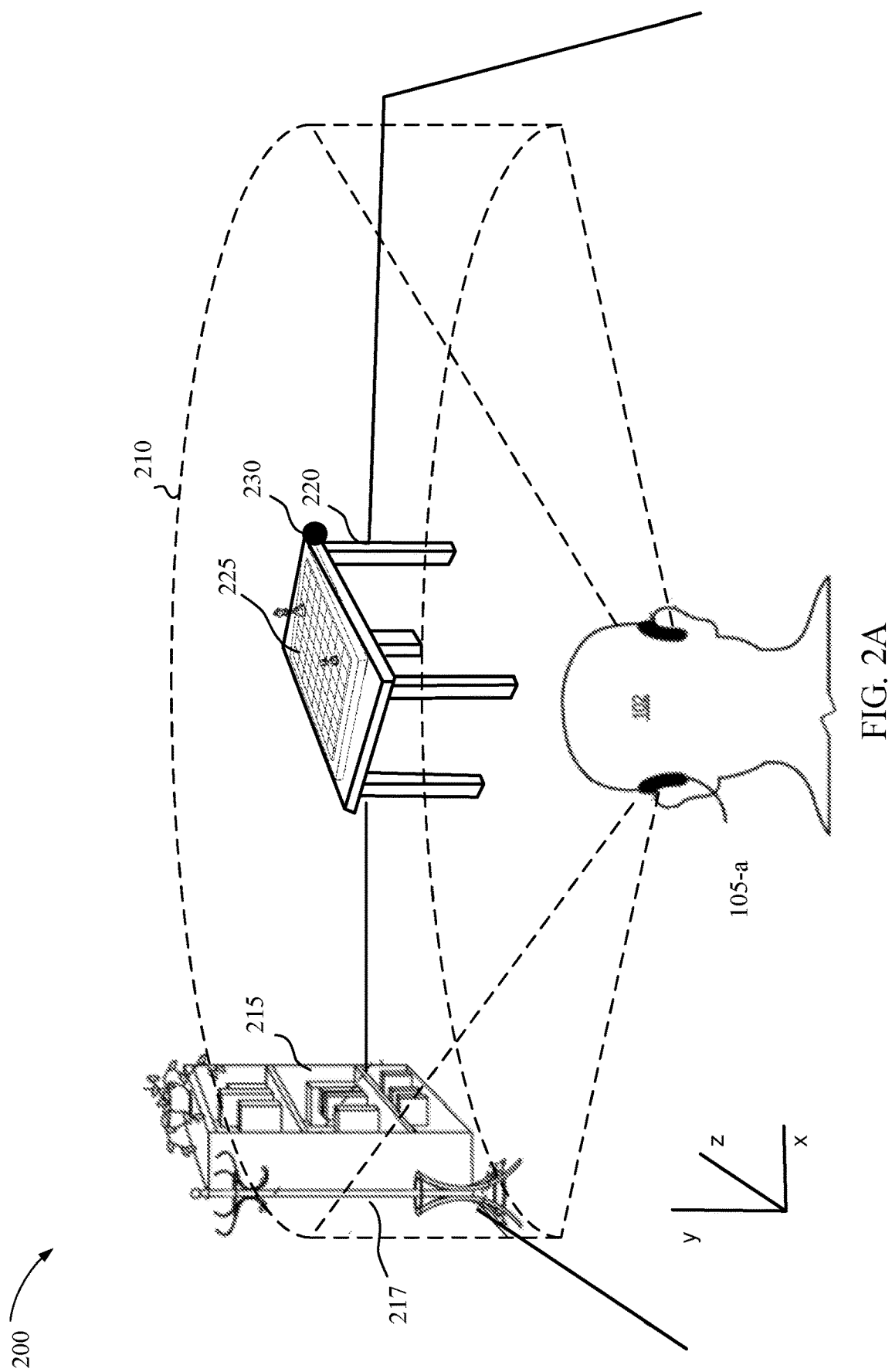
FIGS. 2A-2C show an example environment, including a room in which a user may utilize the display system, such as the HMD device of FIG. 1, for multi-user shared session to view augmentations to the environment.
Figure 2B:
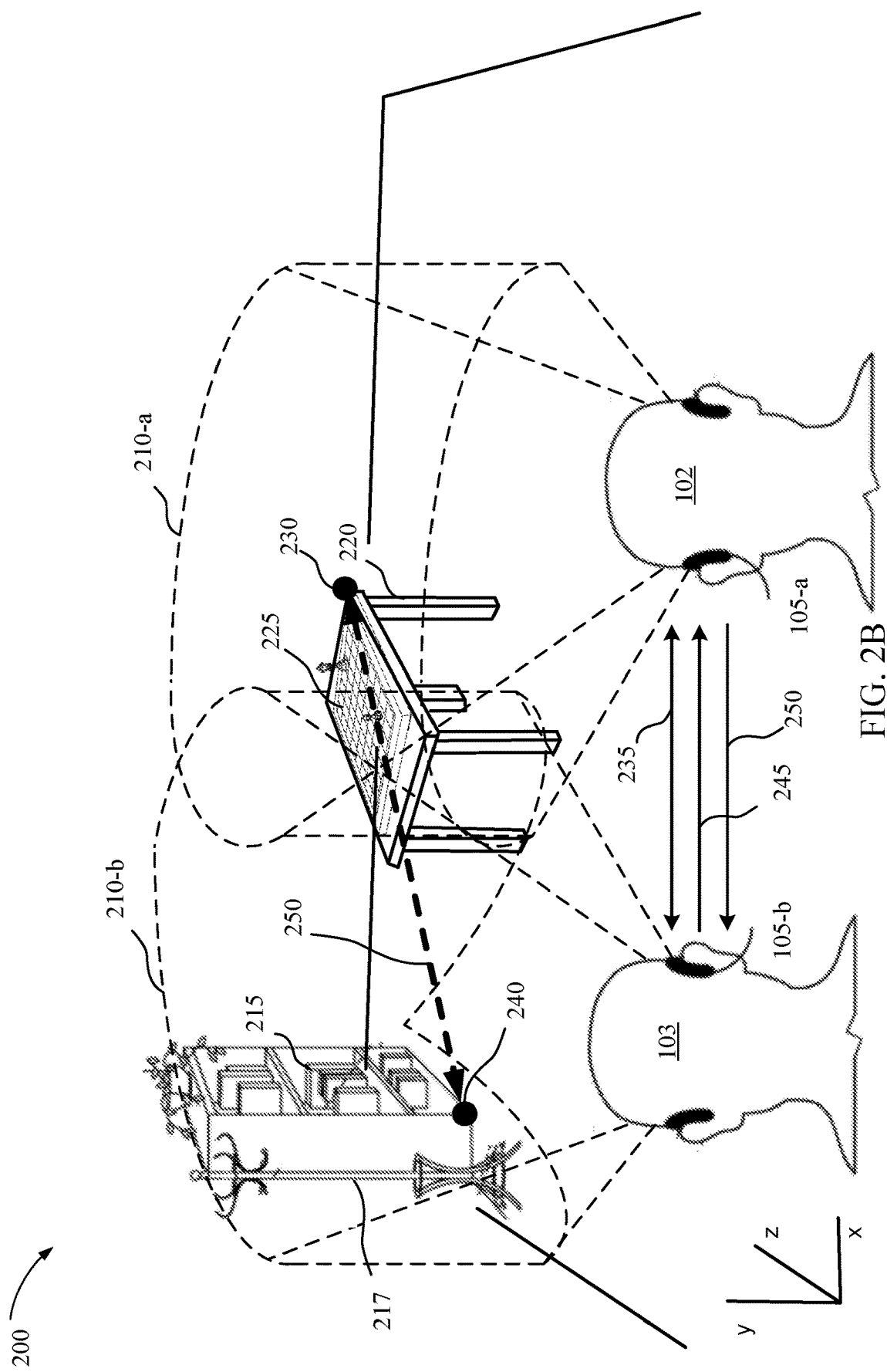
Figure 2C:
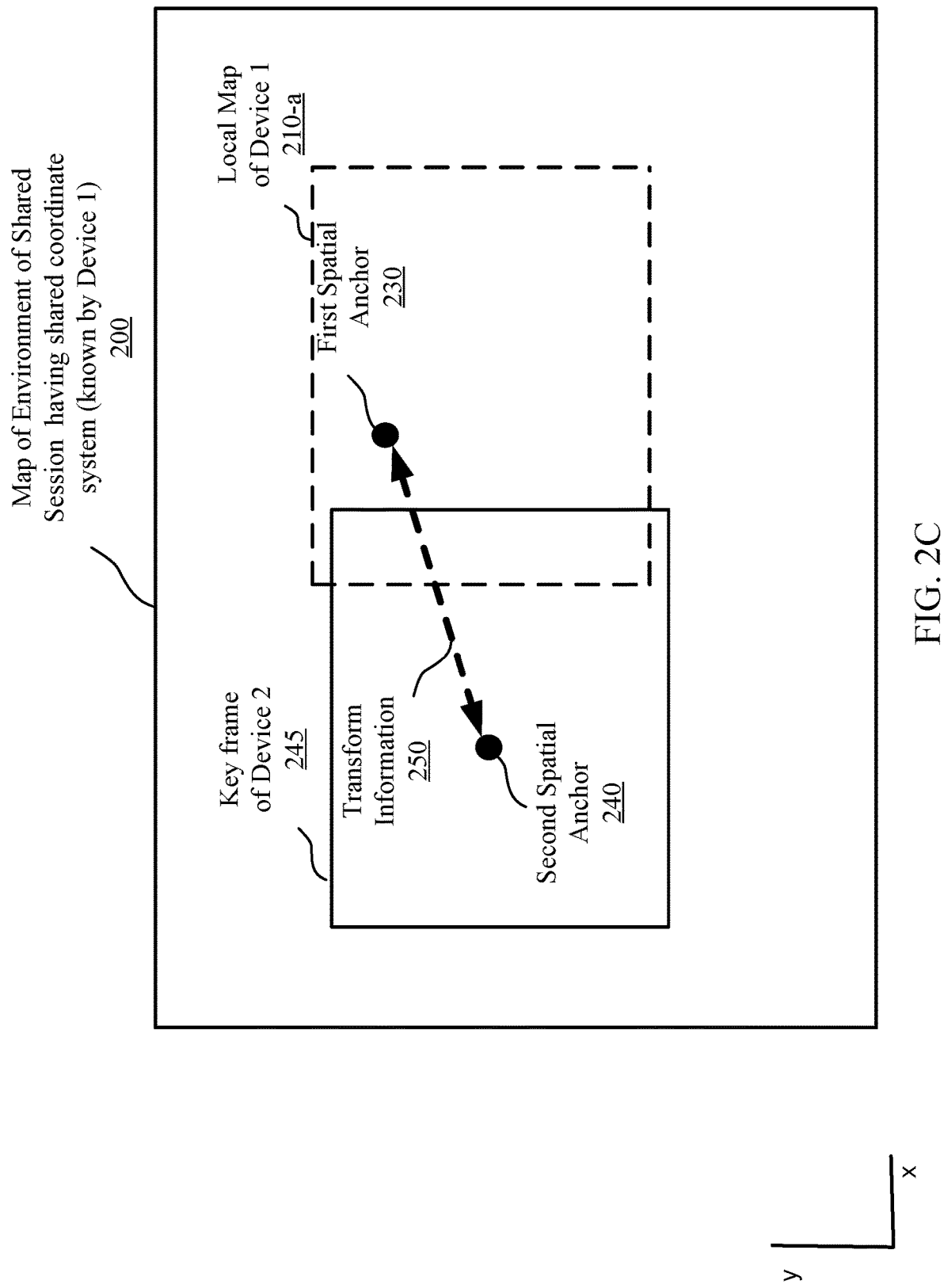

FIGS. 2A-2C, discussed concurrently, show an example of initiating remote localization of HMDs 105 (e.g., a first HMD 105-*a* and a second HMD 105-*b*) in accordance with features of the present disclosure. Turning first to FIG. 2A, a first user 102 may use the first HMD 105-*a* to map environment 200 associated with a shared coordinate system. The environment 200 may be an example of a room in which a first user 102 generate VR/AR/MR images in a shared coordinate system. The environment 200 may include combination of real environment objects such as physical table 220 and other household items such as bookshelf 215 and coat hanger 217. The environment 200 may also include one or more hologram objects 225, such as a virtual chess board 225, and chess pieces, that are overlaid onto the real table 220. As it should be appreciated by those of ordinary skill in the art, the hologram object 225 would not be physically located in the room, but may be projected onto each HMD 105 such that the first user 102 may view the projected hologram object 225 as if it were in the room.

Each HMD 105 may also include a hybrid display system that includes two different displays forming a display stack in the device. The display stack may provide a see-through display through which the user views the real-world environment. Any images that are displayed via the display stack may be rendered so as to appear within the environment as viewed through the see-through display. For example, a virtual object displayed via the HMDs 105 may appear to be "floating" in front of a user, to occlude one or more real/physical objects in the environment, to overlay one or more real/physical objects in the environment, and/or to otherwise be viewable within the environment.

As noted above, first HMD 105-*a* may include a partially see-through display configured to visually augment the view of first user 102 through the display of the real world three dimensional environment of living room. The first HMD 105-*a* may generate a virtual model of the living room using a three dimensional coordinate space overlaid upon the real world living room. In the example of FIGS. 2A-2C, such three dimensional coordinate space may be indicated by x-y-z axes. Each HMD 105 also may include program logic configured to identify physical objects within the living room.

Thus, in some examples, the first user 102 associated with the first HMD 105-*a* that generates a shared coordinate system of the environment 200 associated with the shared session may map a first spatial anchor 230 (e.g., x-y-z coordinates of at least a portion of the physical table 220) that is fixed in the three dimensional space according to position and orientation coordinates (e.g., position of the real table in the first user's real environment 200). Because the first HMD 105-*a* of the first user 102 may generate the shared coordinate system, the first HMD 105-*a* may be knowledgeable about the entire environment (or "spatial map") associated with the generated environment 200, including one or more other objects 215, 217 that may be part of the shared coordinate system. Each of the objects in the environment 200 may include a separate spatial anchor. For example, while the table 220 may be associated with the coordinate and orientation position of the first spatial anchor 230, the bookshelf 215 that is fixed in the three dimensional space may have a separate coordinate and orientation position(s) recognized as second spatial anchor 240.

In order to facilitate a multi-user platform, it may not be necessary for the first user 102 associated with the first HMD 105 to transmit the entire data set for the environment 200 because transmission of the entire environment 200 may require exporting large quantities of data. As such, the first HMD 105 may transmit a limited set of information of the environment 200, including the first spatial anchor 230, e.g., the coordinate and orientation position of the table 220 that is fixed in the user's environment 200, and one or more hologram object 225 (e.g., virtual chess board) that is generated for projection atop the table 220.

Upon the first HMD 105-*a* generating the shared coordinate system of the environment 200, the first user 102 associated with the first HMD 105-*a* may initiate, or the first HMD 105-*a* may automatically, establish a sharing communication 235 with the second HMD 105-*b*, as illustrated in FIG. 2B, to share the shared coordinate system with a second user 103 associated with the second HMD 105-*b* to establish a shared virtual session. Sharing the coordinate system of the environment 200 may include transmitting the coordinate and orientation information of the first spatial anchor 230 and at least one hologram object 225. The second user 103 may accordingly utilize the second HMD 105-*b* to view augmentations to the environment 200 generated and shared by the first user 102.

Accordingly, as shown in FIG. 2B, each user (first user 102 and the second user 103) may view the shared coordinate system of the environment 200 using the HMDs 105. In some examples, each HMD 105 may be located or oriented differently relative to the environment 200, and thus each field of view 210 may have a different perspective of the environment 200 and may include different views. For example, the first user 102 may have a first field of view 210-*a*, while the second user 103 may have a second field of view 210-*b* of the same environment 200. The real objects and the regions of the real-world environment included in each of the fields of view of each user may change as the first user 102 and/or the second user 103 moves his/her head. However, the relative size and spacing of the fields of view may be maintained, thus tying the viewspace of the user to the fields of view, rather than the environment 200. Hologram objects 225 (e.g., virtual chess board) displayed via the HMD 105 may be environment-locked (e.g., tied to a real object such that the position of the virtual object changes relative to the user's viewspace as the user moves his/her head but does not change relative to the real object) or user-locked (e.g., tied to the user's viewspace such that the position of the virtual object does not change relative to the user's viewspace as the user moves his/her head but does change relative to real objects in the environment).

As noted above, and illustrated in the two dimensional (2D) representation of the environment 200 in FIG. 2C, while the first user 102 and the corresponding first HMD 105-*a* may have a partial field of view 210-*a* of the environment 200, the first HMD 105-*a* may nonetheless be knowledgeable of the entire environment 200 as the creator of the shared coordinate system, including objects outside the current field of view 210-*a* of the first HMD 105, such as the bookshelf 215.

In contrast to the first HMD 105-*a*, the second HMD 105-*b* may have a limited knowledge of the environment 200. As such, in some instances, the second HMD 105-*b* may be uncertain of its position within the shared coordinate system of the environment 200 associated with the shared virtual session. For instance, the second HMD 105-*b* may be unable to locate the first spatial anchor 230 (a set of shared coordinate system points associated with the real world table) within its field of view 210-*b*). In some examples, the uncertainty may be due to the fact that the first spatial anchor 230 may be outside the field of view 210-*b* of the second HMD 105-*b*.

However, as illustrated in FIGS. 2B and 2C, the second HMD 105-*b* may be able to identify a second spatial anchor 240 (e.g., a set of one or more coordinate points/positions associated with the bookshelf 215) within the field of view 210-*b* of the second HMD 105-*b*. As such, the second HMD 105-*b* (query device) may initiate a remote localization request 247 (FIG. 2B) that enlists the help of the first HMD 105-*a* (i.e., sharing device) that originally generated the shared virtual session. To facilitate the remote localization request 247, the second HMD 105-*b* may generate a key frame information 245 that includes a subset of available data. For example, as opposed to transmitting all available information that the second HMD 105-*b* may have at its disposal, the second HMD 105-*b* may generate a key frame 245 with, for example, an image frame of the current field of view 210-*b* of the second HMD 105-*b* that includes identification of the second spatial anchor 240. That is, while the second HMD 105-*b* may be uncertain of its own location or position with respect to the first spatial anchor 230 (e.g., table 220), the second HMD 105-*b* may be aware of its position with respect to the second spatial anchor 240 (e.g., the bookshelf 215 in the living room). Thus, the second HMD 105-*b* may transmit remote localization request 247 to the first HMD 105-*a* that includes the key frame 245, including the image frame and the second spatial anchor 240 (e.g., coordinates of the bookshelf 215).

Upon receiving the remote localization request 247, the first HMD 105-*a* (e.g., sharing device) may locate the included key frame(s) 245 within the shared coordinate system, which in this case is its current spatial map of its environment 200 (e.g., by accessing information stored in the database of the first HMD device 105). If the first HMD 105-*a* identifies the key frame in its database, the first HMD 105-*a* may calculate transform information 250 between the first spatial anchor 230 and the second spatial anchor 240, and transmit the transform information 250 from the first HMD 105-*a* to the second HMD 105-*b* such that the second HMD 105-*b* may synchronize to the shared coordinate system used by the two devices by identifying the location of the second HMD 105-*b* within the environment 200 relative to the first spatial anchor 230. For example, the transform information 250 may be relative difference information, e.g., any information that identifies the relative location and/or relative orientation of the second spatial anchor 240 with respect to the first spatial anchor 230. Thus, the second HMD 105-*b* can identify the exact location of the first spatial anchor 2303 (by applying the relative difference to its known location of the second spatial anchor 240), and thereby align its coordinate system with the shared coordinate system based on the known location of the first spatial anchor 230 in the shared coordinate system. Thus, the two HMDs will be synched within the shared coordinate system.

Figure 3:
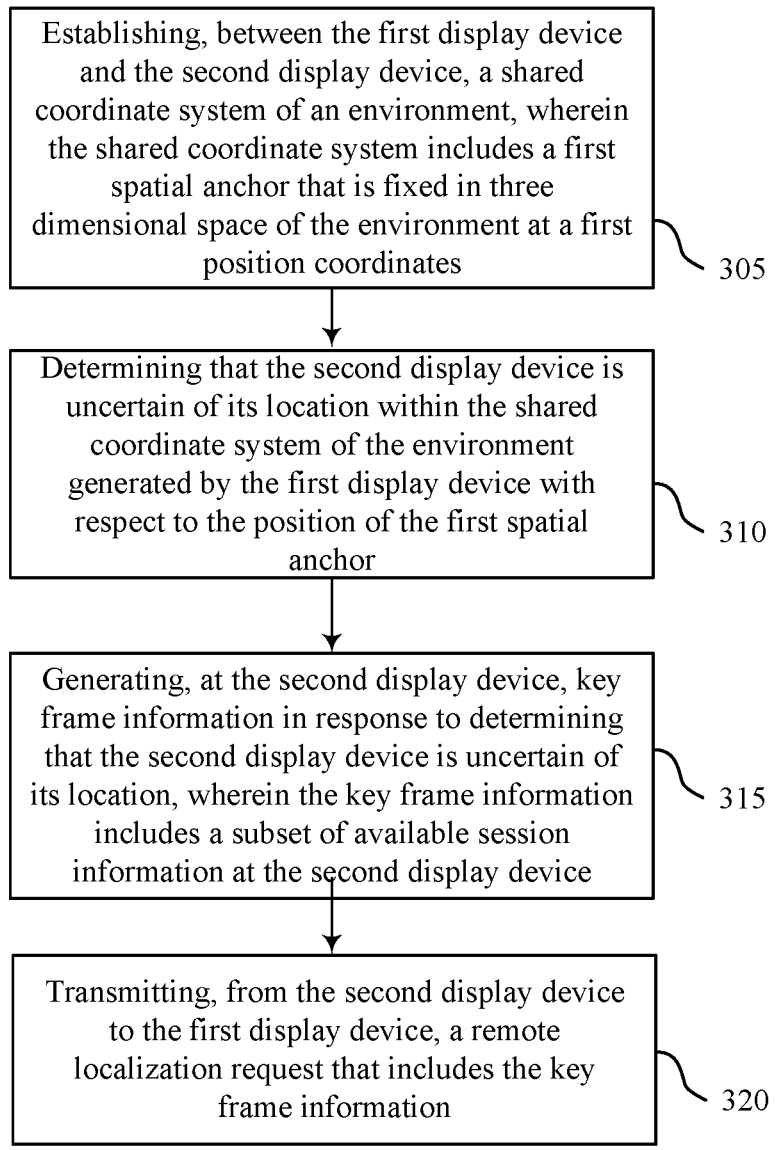
FIG. 3 is a flow chart of a method for displaying virtual reality images in accordance with an implementation of the present disclosure.

Turning next to FIG. 3, method 300 for synchronizing a first display device with a second display device within a shared coordinate system is described. The method 300 may be performed by a display device 105 (e.g., the second HMD 105-*b*) as described with reference to FIGS. 1 and 2A-C. It should be appreciated that the features of the method 300 may be incorporated not only in the HMDs, as described, but also in other display devices 105 such as mobile phones, tablets, or laptops. Although the method 300 is described below with respect to the elements of the display device, other components may be used to implement one or more of the steps described herein.

At block 305, the method 300 may include establishing, between the first display device 105-*a* and the second display device 105-*b*, a shared coordinate system of an environment, wherein the shared coordinate system includes a first spatial anchor that is fixed in three dimensional space of the environment at a first position coordinates. In some examples, establishing a shared session may include receiving a mapping of at least one hologram object in a three dimensional space relative to a first spatial anchor that is fixed in the three dimensional space by position and orientation coordinates. The mapping may be performed by the first display device (e.g., first HMD 105-*a*) and received by the second display device (e.g., second HMD 105-*b*) for use in a collaborative multi-user shared virtual session. Aspects of block 305 may be performed by the communications component 515 and shared virtual session component 540 described with reference to FIG. 5.

At block 310, the method 300 may include determining that the second display device is uncertain of its location within the shared coordinate system of the environment generated by the first display device with respect to the position of the first spatial anchor. In some examples, determining that the second display device 105-*b* is uncertain of its location comprises determining that the second display device is uncertain of the position and orientation coordinates of the first spatial anchor in the three dimensional space. For example, the second display device (e.g., second HMD 105-*b*) may not be able to find the first spatial anchor 230 in its field of view 210-*b*. Aspects of block 310 may be performed by the remote localization component 530 described with reference to FIG. 5.

At block 315, the method 300 may include generating, at the second display device, key frame information in response to determining that the second display device is uncertain of its location, wherein the key frame information includes a subset of available session information at the second display device. In some examples, generating the key frame information 245 includes the second display device (e.g., second HMD 105-*b*) identifying a second spatial anchor having a second position coordinates within the shared coordinate system of the environment. The second spatial anchor 240 may be captured by a sensor on the second display device (e.g., second HMD 105-*b*). The key frame information 245 that includes the subset of available session information of the second display device may comprise one or both of image data from the second display device's head-tracking sensor or calibration information for cameras and sensors of the second display device. Aspects of block 310 may be performed by the key frame processing component 535 described with reference to FIG. 5.

At block 320, the method 300 may include transmitting, from the second display device to the first display device, a remote localization request that includes the key frame information. For example, in an implementation, the remote localization request may be transmitted over the wireless network (e.g., WLAN, Bluetooth, cellular network) or via a wired connection. Aspects of block 320 may be performed by the communication component 515 described with reference to FIG. 5.

Figure 4:
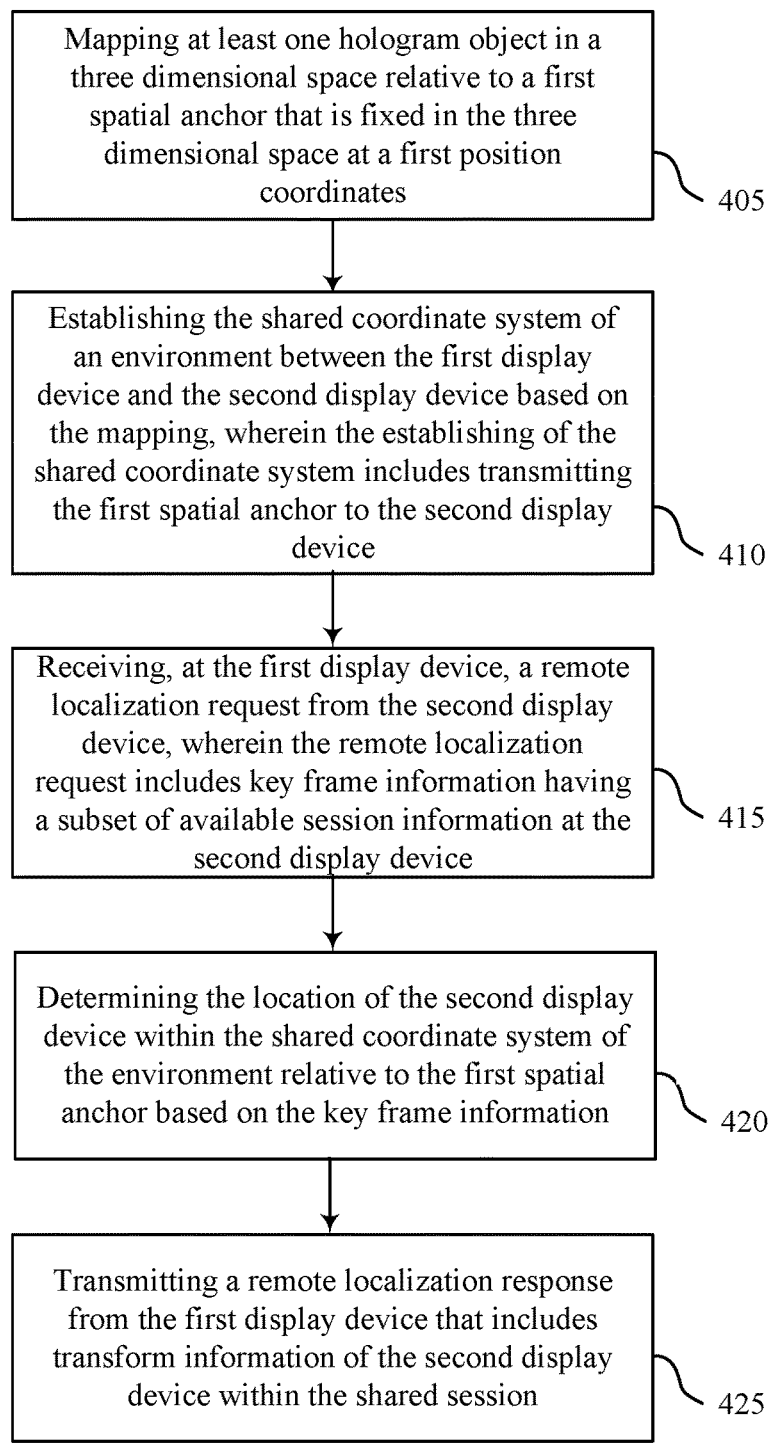
FIG. 4 is another flow chart of a method for displaying virtual reality images in accordance with an implementation of the present disclosure.

The method 300 may further optionally include receiving, at the second display device (e.g., second HMD 105-*b*), a remote localization response from the first display device (e.g., first HMD 105-*a*) that includes transform information of the second display device (e.g., second HMD 105-*b*) within the shared coordinate system of the environment 200, wherein the transform information identifies the first spatial anchor 230 with respect to the second spatial anchor 240. The method 300 may also include determining the position of the first spatial anchor 230 that is fixed at the first position coordinates based on the transform information received from the first display device, and synchronizing the shared coordinate system of the environment between the first display device 105-*a* and the second display device 105-*b* in the shared session based on the transform information Turning next to FIG. 4, another example of a method 400 for synchronizing a first display device with a second display device within a shared coordinate system is described. The method 400 may also be performed by a display device 105 (e.g., the first HMD 105-*a*) as described with reference to FIGS. 1 and 2A-C that may share a generated session with one or more display device(s) for multi-user shared session. It should be appreciated that the features of the method 400 may be incorporated not only in the HMDs, as described, but also in other display devices 105 such as mobile phones, tablets, or laptops. Although the method 400 is described below with respect to the elements of the display device, other components may be used to implement one or more of the steps described herein.

At block 405, the method 400 may include mapping at least one hologram object in a three dimensional space relative to a first spatial anchor that is fixed in the three dimensional space at a first position coordinates. For example, in an implementation, the shared virtual session component 540 may generate one or more hologram objects (e.g., chess board 225) within an environment 200 that may be combination of real environment and virtual environment to be displayed on a display device (e.g., HMD 105). Aspects of block 405 may be performed by the shared virtual session component 540 described with reference to FIG. 5.

At block 410, the method 400 may include establishing the shared coordinate system of an environment between the first display device and the second display device based on the mapping, wherein the establishing of the shared coordinate system includes transmitting the first spatial anchor to the second display device. For example, in an implementation, the first user 102 associated with the first HMD 105-*a* may initiate, or the first HMD 105-*a* may automatically, establish a sharing communication 235 with the second HMD 105-*b* to share the shared coordinate system with a second user 103 associated with the second HMD 105-*b* to establish a shared virtual session. Sharing the coordinate system of the environment 200 may include transmitting the coordinate and orientation information of the first spatial anchor 230 and at least one hologram object 225. Aspects of block 405 may be performed by the shared virtual session component 540 described with reference to FIG. 5.

At block 415, the method 400 may include receiving, at the first display device, a remote localization request from the second display device, wherein the remote localization request includes key frame information having a subset of available session information at the second display device. For example, in an implementation, in order to facilitate the remote localization request 247, the second HMD 105-*b* may generate a key frame information 245 that includes a subset of available data. For example, as opposed to transmitting all available information that the second HMD 105-*b* may have at its disposal, the second HMD 105-*b* may generate a key frame 245 with, for example, an image frame of the current field of view 210-*b* of the second HMD 105-*b* that includes identification of the second spatial anchor 240. Aspects of block 415 may be performed by the communications component 515 described with reference to FIG. 5.

At block 420, the method 400 may include determining the location of the second display device within the shared coordinate system of the environment relative to the first spatial anchor based on the key frame information. For example, in an implementation, upon receiving the remote localization request 247, the first HMD 105-*a* (e.g., sharing device) may locate the included key frame(s) information 245 within the shared coordinate system, which in this case is its current spatial map of its environment 200 (e.g., by accessing information stored in the database of the first HMD device 105). If the first HMD 105-*a* identifies the key frame in its database, the first HMD 105-*a* may calculate transform information 250 between the first spatial anchor 230 and the second spatial anchor 240. Aspects of block 420 may be performed by the remote localization component 530 described with reference to FIG. 5.

At block 425, the method 400 may include transmitting a remote localization response from the first display device that includes transform information of the second display device within the shared session. For example, in an implementation, the first display device (e.g., first HMD 105-*a*) may transmit the transform information 250 from the first HMD 105-*a* to the second HMD 105-*b* such that the second HMD 105-*b* may synchronize to the shared coordinate system used by the two devices by identifying the location of the second HMD 105-*b* within the environment 200 relative to the first spatial anchor 230. Aspects of block 425 may be performed by the communications component 515 described with reference to FIG. 5.

To summarize, in one implementation, for example, there may be three steps to the remote localization techniques utilized by the devices in the system as described herein. These steps are initiated when a device (referred to as the Sharing Device) shares at least a part of a shared coordinate system (including a Spatial Anchor) to a set of one or more other devices. Any device (referred to as the Query Device) that does not already know its location relative to the shared coordinate system will begin the remote localization process. If a device is already aware of its location relative to the coordinate system (like if those two devices had already shared with each other before) then no additional steps are necessary because both devices can reason about the same coordinate system.

In the first step, which may be referred to as getting a request, the Query Device assembles a collection of data that the Sharing Device will use to perform the remote localization. This data is usually (but not limited to) at least one key-frame, which may include image data from the device's head-tracking sensors as well as calibration information for cameras and other sensors (like a gravity sensor), which can be used for localization on the Sharing Device. The resulting collection of data can then be transferred to the Sharing Device.

In the second step, which may be referred to as processing a request, when the Sharing Device receives a Remote Localization Request from a Query Device, it takes the query data and uses it to locate the included key-frame(s) within its current spatial map of its environment. If the Sharing Device successfully localizes the Query data, it packages up the resulting pose/transform information to the shared Spatial Anchor into a Remote Localization Response. The Response is then transmitted back to the Query Device.

In the third step, which may be referred to as processing a response, when the Query Device receives a successful Remote Localization Response, it can then take the resulting pose/transform and incorporate the shared Spatial Anchor directly into its map, relative to the original query key-frame(s) by using the resulting pose/transform. Once incorporated into the map, the Query Device can now reason about the shared Spatial Anchor in the same manner that the Sharing Device can, and thus both devices are now in shared coordinate frame and can display holograms (or do other coordinated processing) in the exact same physical location.

If the Query Device receives an unsuccessful Remote Localization Response then it can try again by using a newer Remote Localization Request, which may capture the Query Device's environment data from a slightly different angle (assuming the device had moved at all), which would increase the chance of a successful Remote Localization, assuming the two devices were in the same physical location and had observed the same physical environment.

Devices utilizing the remote localization techniques described herein may experience benefits over other approaches to sharing, such as one or more of: much lower latency to get into a common coordinate system; lower use of bandwidth due to lower amounts of data being collected, exchanged, and processed (e.g., using the methodology of prior solutions that requires exporting a neighborhood of data and then importing that data onto a different device could take anywhere from 10-60 seconds and require transporting 10-30 MB worth of data; in contrast, the remote localization techniques of this disclosure can be performed in under 2 seconds and may only transport at most 1.5 MB of data); and Privacy/Security advantages. Regarding privacy and security, for example, using the export/import methodology for sharing in prior solutions meant that actual map data from one device was permanently copied to another device. Some of the data could be privacy-sensitive and would be at risk if a way to reverse engineer the map data format into images were found. For the remote localization techniques of this disclosure, the Query data is generally not merged into the Sharing device's map, and thus map data is generally not saved onto a device that it itself did not create.

Referring now to FIG. 5, a diagram illustrating an example of a hardware implementation for displaying an image frame on a display device (e.g., HMD) in accordance with various aspects of the present disclosure is described. In some examples, the image display device 400 may be an example of the HMD 105 described with reference to FIGS. 1 and 2.

The display device 500 may include a processor 505 for carrying out one or more processing functions (e.g., methods 300 and 400) described herein. The processor 505 may include a single or multiple set of processors or multi-core processors. Moreover, the processor 505 can be implemented as an integrated processing system and/or a distributed processing system.

The display device 500 may further include memory 510, such as for storing local versions of applications being executed by the processor 505. In some aspects, the memory 510 may be implemented as a single memory or partitioned memory. In some examples, the operations of the memory 510 may be managed by the processor 505. Memory 510 can include a type of memory usable by a computer, such as random access memory (RAM), read only memory (ROM), tapes, magnetic discs, optical discs, volatile memory, non-volatile memory, and any combination thereof. Additionally, the processor 405, and memory 510 may include and execute operating system (not shown).

Further, display device 500 may include a communications component 515 that provides for establishing and maintaining communications with one or more parties utilizing hardware, software, and services as described herein. Communications component 515 may carry communications between components on display device 500. The communications component 515 may also facilitate communications with external devices to the display device 500, such as to electronic devices coupled locally to the image display device 500 and/or located across a communications network and/or devices serially or locally connected to display device 500. For example, communications component 515 may include one or more buses operable for interfacing with external devices. In some examples, communications component 515 establish real-time video communication events such as real-time video calls, instant messaging sessions, screen sharing or whiteboard sessions, etc., via the network, with another user(s) of the communication system operating their own devices running their own version of the communication client software in order to facilitate augmented reality.

The display device 500 may also include a user interface component 520 operable to receive inputs from a user of display device 500 and further operable to generate outputs for presentation to the user. User interface component 520 may include one or more input devices, including but not limited to a navigation key, a function key, a microphone, a voice recognition component, joystick or any other mechanism capable of receiving an input from a user, or any combination thereof. Further, user interface component 520 may include one or more output devices, including but not limited to a speaker, headphones, or any other mechanism capable of presenting an output to a user, or any combination thereof.

The display device 500 may include a display 525 including a light module having one or more light engines, optics, and one or more waveguides (e.g., one for each eye) for presenting images, such as hologram, to a user of the device.

The display device 500 may include a remote localization component 530 that controls the light engine(s) to generate an image visible to the wearer of the HMD, i.e. to generate slightly different 2D or 3D images that are projected onto the waveguide for each eye so as to create the impression of 3D structure and generate shared sessions to be shared with one or more other display device(s) 500.

The remote localization component 530 may process remote localization requests from other HMD devices that may be uncertain of its location within a shared virtual session. For example, the first HMD 105 may share the shared coordinate system of the environment (virtual and/or real environment) associated with the shared virtual session with one or more second HMDs 105. The shared coordinate system may include one or more of the hologram object information as well as the spatial anchor position (x-y-z coordinates and orientation) of the physical table in the user's environment, and may be generated by the shared virtual session component 540.

As the first HMD 105 is responsible for mapping the virtual and real environment, the first HMD 105 may be knowledgeable of not only the coordinate system of the environment as observed in the field of view of the first HMD 105, but may also be knowledgeable of the entire environment in the shared coordinate system, which may include hologram objects and real environment objects outside the immediate field of view of the first HMD 105.

The second HMD 105 that may participate in the shared coordinate system of the environment (virtual and/or real environment) associated with the shared virtual session, however, may have a limited knowledge of the coordinate system of the environment shared by the first HMD 105. As such, in some examples, although the first HMD 105 may share the spatial anchor coordinate position of the physical table within the environment (referred to as "first spatial anchor") of the shared virtual session, the second HMD 105 may fail to (or be unable to) to identify the location of the first spatial anchor within the environment known by the second HMD 105.

In such a situation, the second HMD 105 may initiate remote localization procedure by generating a key frame information that may be a three dimensional (3D) model of where the user of the second HMD 105 device is currently located within one or both of the virtual and physical environment (e.g., a coordinate position). This may include capturing one or more image(s) associated with the field of view of the second HMD 105 based on cameras on the second HMD 105. Additionally or alternatively, the key frame information, may include one or more image data from the display device's head-tracking sensors and/or calibration information from cameras and other sensors (e.g., gravity sensor) from the display device's perspective of the environment of the shared coordinate system. The key frame information generation (by the second display device) and processing (by the first display device) may be performed by the key frame processing component 535 based on whether the display device 500 is operating as a sharing device (e.g., first HMD 105-*a*) or query device (e.g., second HMD 105-*b*). In some examples, the remote localization requests may be processed by the remote localization component 530.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a device, which can be a wired device or a wireless device. A wireless device may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. In contract, a wired device may include a server operable in a data centers (e.g., cloud computing).

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It should be appreciated to those of ordinary skill that various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave may be included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While aspects of the present disclosure have been described in connection with examples thereof, it will be understood by those skilled in the art that variations and modifications of the aspects described above may be made without departing from the scope hereof. Other aspects will be apparent to those skilled in the art from a consideration of the specification or from a practice in accordance with aspects disclosed herein.

What is claimed is:

1. A method for synchronizing a first display device with a second display device within a shared coordinate system, comprising:
    establishing, between the first display device and the second display device, a shared coordinate system of an environment, wherein the shared coordinate system comprises a limited set of information of the environment associated with the first display device including a first spatial anchor that is fixed in three dimensional space of the environment at a first position coordinates, with the limited set of information being less than an entirety of the environment associated with the first display device;
    determining that the second display device is uncertain of its location within the shared coordinate system of the environment generated by the first display device with respect to the position of the first spatial anchor;
    generating, at the second display device, key frame information in response to determining that the second display device is uncertain of its location, wherein the key frame information includes a subset of available session information at the second display device, with the subset being less than all of the available session information; and
    transmitting, from the second display device to the first display device, a remote localization request that includes the key frame information.

2. The method of claim 1, further comprising:
    receiving, at the second display device, a remote localization response from the first display device that includes transform information of the second display device within the shared coordinate system of the environment, wherein the transform information identifies the first spatial anchor with respect to a second spatial anchor;
    determining the position of the first spatial anchor that is fixed at the first position coordinates based on the transform information received from the first display device; and synchronizing the shared coordinate system of the environment between the first display device and the second display device in the shared session based on the transform information.

3. The method of claim 1, wherein establishing the shared coordinate system of the environment between the first display device and the second display comprises:
mapping at least one hologram object in a three dimensional space relative to the first spatial anchor.

4. The method of claim 1, wherein generating the key frame information in response to determining that the second display device is uncertain of its location further comprises:
identifying, at the second display device, a second spatial anchor having a second position coordinates within the shared coordinate system of the environment, wherein the second spatial anchor is captured by a sensor on the second display device.

5. The method of claim 1, wherein the key frame information comprises one or both of image data from a head-tracking sensor of the second display device or calibration information from cameras and/or sensors of the second display device.

6. The method of claim 1, wherein one or both of the first display device and a second display device is a head mounted display (HMD) device.

7. The method of claim 1, wherein the shared coordinate system includes one or more of a virtual reality (VR), augmented reality (AR), or mixed reality (MR) session.

8. A method for synchronizing a first display device with a second display device within a shared coordinate system, comprising:
mapping at least one hologram object in a three dimensional space relative to a first spatial anchor that is fixed in the three dimensional space at a first position coordinates;
establishing the shared coordinate system of an environment between the first display device and the second display device based on the mapping, wherein the establishing of the shared coordinate system comprises transmitting a limited set of information of the environment associated with the first display device including the first spatial anchor to the second display device, with the limited set of information being less than an entirety of the environment associated with the first display device;
receiving, at the first display device, a remote localization request from the second display device, wherein the remote localization request includes key frame information having a subset of available session information at the second display device, with the subset being less than all of the available session information;
determining the location of the second display device within the shared coordinate system of the environment relative to the first spatial anchor based on the key frame information; and
transmitting a remote localization response from the first display device that includes transform information of the second display device within the shared session.

9. The method of claim 1, wherein the key frame information includes information associated with a second spatial anchor having a second position coordinates within the shared coordinate system of the environment.

10. The method of claim 9, wherein determining the location of the second display device within the shared coordinate system of the environment comprises:
calculating a transform between the first spatial anchor having the first position coordinates and the second spatial anchor having the second position coordinates; and
transmitting the transform information to the second display device, wherein the second display device uses the transform information to identify the relative location of the second spatial anchor to the first spatial anchor.

11. A display device, comprising:
a processor; and
a memory, coupled to the processor, and storing instructions that are executable by the processor to:
establish, between a first display device and a second display device, a shared coordinate system of an environment, wherein the shared coordinate system comprises a limited set of information of the environment associated with the first display device including a first spatial anchor that is fixed in three dimensional space of the environment at a first position coordinates, with the limited set of information being less than an entirety of the environment associated with the first display device;
determine that the second display device is uncertain of its location within the shared coordinate system of the environment generated by the first display device with respect to the position of the first spatial anchor;
generate, at the second display device, key frame information in response to determining that the second display device is uncertain of its location, wherein the key frame information includes a subset of available session information at the second display device, with the subset being less than all of the available session information; and
transmit, from the second display device to the first display device, a remote localization request that includes the key frame information.

12. The display device of claim 11, wherein the instructions are further executable by the processor to:
receive, at the second display device, a remote localization response from the first display device that includes transform information of the second display device within the shared coordinate system of the environment, wherein the transform information identifies the first spatial anchor with respect to a second spatial anchor;
determine the position of the first spatial anchor that is fixed at the first position coordinates based on the transform information received from the first display device; and
synchronize the shared coordinate system of the environment between the first display device and the second display device in the shared session based on the transform information.

13. The display device of claim 11, wherein the instructions to establish the shared coordinate system of the environment between the first display device and the second display are further executable by the processor to:
map at least one hologram object in a three dimensional space relative to the first spatial anchor.

14. The display device of claim 11, wherein the instructions to generate the key frame information in response to determining that the second display device is uncertain of its location are further executable by the processor to:
identify, at the second display device, a second spatial anchor having a second position coordinates within the shared coordinate system of the environment, wherein the second spatial anchor is captured by a sensor on the second display device.

15. The display device of claim 11, wherein the key frame information comprises one or both of image data from a head-tracking sensor of the second display device or calibration information from cameras and/or sensors of the second display device.

16. The display device of claim 11, wherein one or both of the first display device and a second display device is a head mounted display (HMD) device.

17. The display device of claim 11, wherein the shared coordinate system includes one or more of a virtual reality (VR), augmented reality (AR), or mixed reality (MR) session.

18. An display device, comprising:
a processor; and
a memory, coupled to the processor, and storing instructions that are executable by the processor to:
map at least one hologram object in a three dimensional space relative to a first spatial anchor that is fixed in the three dimensional space at a first position coordinates;
establish the shared coordinate system of an environment between the first display device and the second display device based on the mapping, wherein the establishing of the shared coordinate system comprises transmitting a limited set of information of the environment associated with the first display device including the first spatial anchor to the second display device, with the limited set of information being less than an entirety of the environment associated with the first display device;

receive, at the first display device, a remote localization request from the second display device, wherein the remote localization request includes key frame information having a subset of available session information at the second display device, with the subset being less than all of the available session information;

determine the location of the second display device within the shared coordinate system of the environment relative to the first spatial anchor based on the key frame information; and transmit a remote localization response from the first display device that includes transform information of the first display device within the shared session.

19. The display device of claim 18, wherein the key frame information includes information associated with a second spatial anchor having a second position coordinates within the shared coordinate system of the environment.

20. The display device of claim 19, wherein the instructions to determine the location of the second display device within the shared coordinate system of the environment are further executable by the processor to:

calculate a transform between the first spatial anchor having the first position coordinates and the second spatial anchor having the second position coordinates; and transmit the transform information to the second display device, wherein the second display device uses the transform information to identify the relative location of the second spatial anchor to the first spatial anchor.

* * * * *